Figure 1:
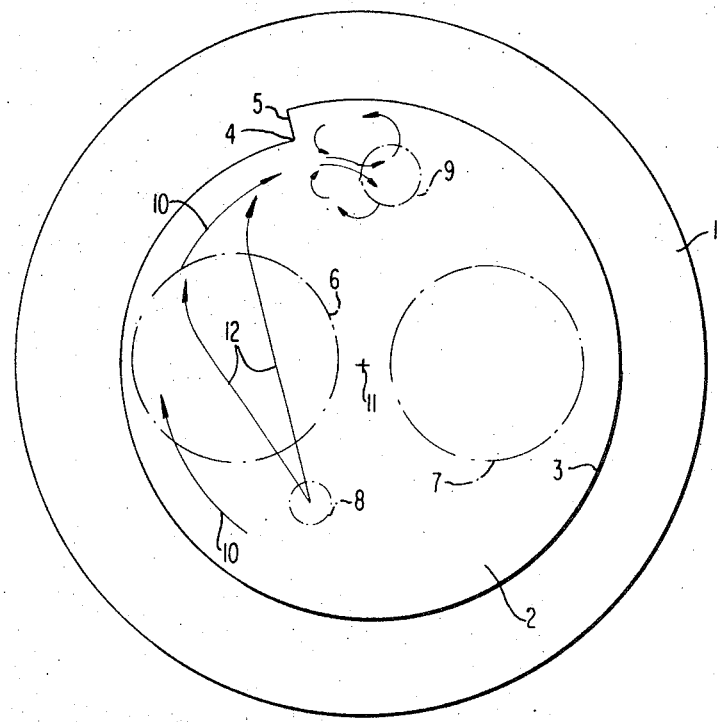

United States Patent

[11] 3,550,566

| [72] | Inventor | Heinrich Hoffmann<br>Stuttgart-Geroksruhe, Germany |
|---|---|---|
| [21] | Appl. No. | 738,978 |
| [22] | Filed | June 21, 1968 |
| [45] | Patented | Dec. 29, 1970 |
| [73] | Assignee | Daimler-Benz Aktiengesellschaft<br>Stuttgart-Unterturkheim, Germany |
| [32] | Priority | June 24, 1967 |
| [33] | | Germany |
| [31] | | No. 1,576,004 |

[54] INJECTION-TYPE INTERNAL COMBUSTION ENGINE WITH APPLIED OR EXTERNAL IGNITION
23 Claims, 2 Drawing Figs.

[52] U.S. Cl. ..................................................... 123/32, 123/30
[51] Int. Cl. ............................................. F02b 17/00
[50] Field of Search ................................................ 123/30, 30.2, 32, 32SPA, 32STR

[56] References Cited
UNITED STATES PATENTS

| 1,967,243 | 7/1934 | Hesselman .................. | 123/32 |
| 2,483,288 | 9/1949 | Malin ......................... | 123/32 |
| 2,947,292 | 8/1960 | Bottger ...................... | 123/32 |
| 3,304,922 | 2/1967 | Hideg ........................ | 123/32 |

*Primary Examiner*—Laurence M. Goodridge
*Attorney*—Craig, Antonelli, Stewart & Hill

ABSTRACT: An internal combustion engine of the injection type with external ignition and with an unthrottled air supply, in which the fuel, controlled in its quantity, is injected at the end of the compression stroke into an essentially axially symmetrical combustion space in the direction of an airstream guided along the walls of the combustion space; the circumferential walls of the combustion space—as viewed in plan view—extend at least over a part of the entire circumference with a continuously decreasing radius in the direction of the airstream and are provided within the area in front of the ignition source with a wall part passing over in the circumferential wall with the larger radius under the formation of a sharp edge.

PATENTED DEC 29 1970  3,550,566

INVENTOR
HEINRICH HOFFMANN

BY Craig e Antonelli

ATTORNEYS

INJECTION-TYPE INTERNAL COMBUSTION ENGINE WITH APPLIED OR EXTERNAL IGNITION

BACKGROUND OF THE INVENTION

The present invention relates to an injection-type internal combustion engine with external or applied ignition in which, with an unthrottled air supply, fuel controlled in its quantity is injected with a nonnegligible free jet length at the end of the compression stroke into an essentially axially symmetrical combustion space in the direction of an air stream guided along the wall of the combustion space.

SUMMARY OF THE INVENTION

The present invention basically aims at achieving the internal combustion engines of this type independently of the rotational speed and of the load and therewith of the injected fuel quantity that an ignitable fuel-air mixture is present at the ignition source at the moment of ignition.

The underlying problems are solved by the present invention in that the circumferential wall of the combustion space—as viewed in plan view—extends at least over a part of the entire circumference with a continuously decreasing radius in the direction of the airstream and passes over within the area in front or upstream of the ignition source into the circumferential wall with the larger radius under formation of a sharp edge by means of a wall part disposed along a diametric plane.

Insofar as the internal combustion engine is so operated that the injected fuel is torn along or forcibly taken along by the airstream prior to reaching the circumferential wall of the combustion space, swirls and eddies are mechanically produced in the combustion air and in the fuel by the proposed sharp edge in the combustion space if the mixture flows with increasing angular velocity over the edge. These eddies or turbulences prepare a favorable mixture formation which is additionally enhanced by the fact that as a result of a pressure decrease behind or downstream of the sharp edge, the mixture is evaporated in an accelerated manner. A reliable and safe ignition is assured because the intimate mixture in vapor form is conducted from the sharp edge directly up to in front of or underneath the ignition source.

Particular circumstances, which can be found, for example, in the type of fuel used, may make it necessary to construct the internal combustion engine in such a manner that the fuel is injected against the circumferential wall of the combustion space. With such a type of internal combustion engine, there is achieved with the proposed sharp edge in the combustion space that the fuel impinging against the combustion space walls becomes detached from the combustion chamber wall at the sharp edge by reason of its kinetic energy and under the influence of the airstream and subsequently impinges again against the combustion space wall within the area of the ignition source where it evaporates readily as a result of the eddying or swirling movement and of the pressure decrease within the turbulence area behind or downstream of the sharp edge.

In one advantageous construction of the present invention, the ignition source may be disposed opposite the sharp edge in extension of the part of the circumferential wall of the combustion space disposed along the smallest radius.

In an internal combustion engine with air distribution of the fuel, the distance of the sharp edge from the center longitudinal axis through the combustion space may be larger than the distance of the ignition source from the center longitudinal axis. In contradistinction thereto, in an internal combustion engine with a wall distribution of the fuel, the arrangement may be so made that the distance of the sharp edge from the center longitudinal axis through the combustion space is smaller than the distance of the ignition source from the center longitudinal axis.

Finally, the sharp edge may be located—as viewed in plan view—within an angular area of 15 to 25 in front of the ignition source which may be constructed as spark plug or glow plug.

Accordingly, it is an object of the present invention to provide an injection-type internal combustion engine with external ignition which avoids by simple means the aforementioned shortcomings and drawbacks encountered in the prior art.

Another object of the present invention resides in an injection-type internal combustion engine with external ignition in which an ignitable fuel-air mixture is present at the moment of ignition independently of the rotational speed and load of the engine.

A further object of the present invention resides in an internal combustion engine of the injection type in which a favorable mixture formation is achieved in addition to an accelerated evaporation of the mixture.

Figure 2:
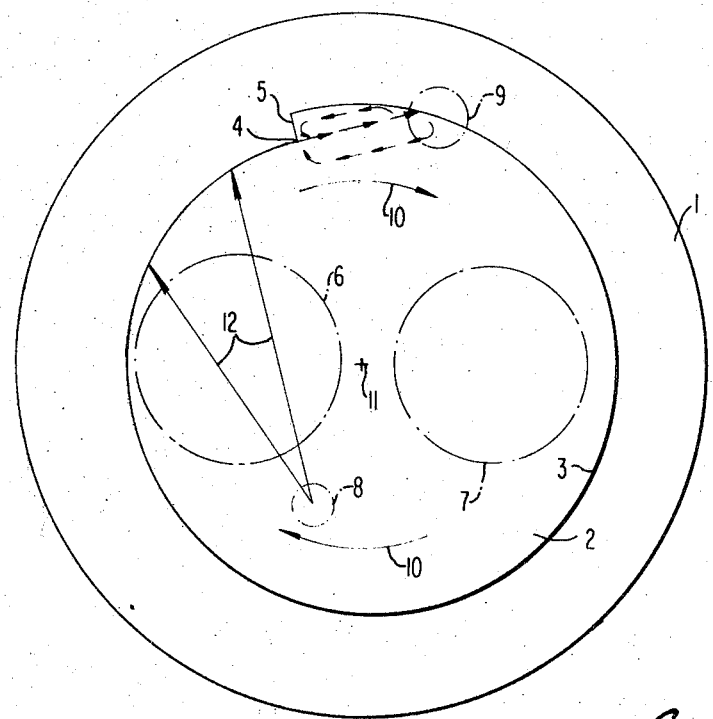

These and further objects, features and advantages of the present invention will become more obvious from the following description when taken in connection with the accompanying drawing, which shows, for purposes of illustration only, two embodiments in accordance with the present invention, and wherein:

FIG. 1 is a schematic plan view on a piston for an injection-type internal combustion engine in accordance with the present invention; and FIG. 2 is a schematic plan view, similar to FIG. 1, on a piston of a modified embodiment of an injection-type internal combustion engine in accordance with the present invention.

Referring now to the drawing wherein like reference numerals are used in the two views to designate like parts, and more particularly to FIG. 1, reference numeral 1 designates in this FIG. the piston of an injection-type internal combustion engine of otherwise conventional construction and not illustrated in detail. The essentially axially symmetrical combustion space 2 which is arranged within the piston 1 is provided with circumferential walls 3 extending with a continuously decreasing radius over about half the length of the entire circumference. The circumferential wall 3 of the combustion space 2 passes over into the circumferential wall having the larger radius under the formation of the sharp edge 4 by way of a wall part 5 disposed in a diametric plane.

The inlet valve 6, the exhaust valve 7, the injection nozzle 8 and the ignition source 9, all of conventional construction, are arranged above the piston 1 within the cylinder head (not shown) of the internal combustion engine. Conventional means may be provided in the inlet channel leading to the inlet valve 6 and/or at the inlet valve 6 itself in order to impart a rotary motion to the combustion air in such a manner that the combustion air circulates within the combustion space 2 in the direction of arrow 10. The ignition source 9 is disposed approximately in the extension of the circumferential wall portion 3 of the combustion space 2 extending with the smaller radius approximately 15° to 25° to the rear or downstream of the sharp edge 4. The distance of the ignition source 9 from the center longitudinal axis 11 of the combustion space 2 or of the piston 1 is smaller than the distance of the sharp edge 4 from the center longitudinal axis. The injection nozzle 8 is disposed approximately diametrically opposite the ignition source 9 and the fuel jets 12 injected from the injection nozzle 8 with unthrottled air supply at the end of the compression stroke are directed in the direction of flow of the combustion air against that part of the circumferential wall 3 that has the smaller radius.

During the operation of the internal combustion engine, if fuel is injected from the injection nozzle 8 during the compression stroke prior to the upper dead center position into the combustion air circulating in the combustion space 2 in the direction of arrow 10, an intimate mixing between fuel and air takes place within the area of the circumferential wall in front of the sharp edge 4 whereas eddies or swirls form within the area of the sharp edge 4, and by reason of the pressure decrease to the rear of the sharp edge 4, the fuel-air mixture is brought in vapor form directly up to in front of or underneath the ignition source 9 whereby a reliable ignition is assured.

Whereas in the case of FIG. 1, the internal combustion engine is so operated that the fuel prior to reaching the circumferential walls 3 of the combustion space 2 is taken along by the rotating airstream, the arrangement in the case of the embodiment according to FIG. 2 is made in such a manner that the fuel with the fuel jets 12 impinges against the circumferential wall 3 of the combustion space 2 within the area in front of the sharp edge 4. By reason of its kinetic energy and under the influence of the combustion air rotating in the direction of arrow 10, the fuel is detached from the circumferential wall 3 of the combustion space 2 in the tangential direction at the sharp edge 4 and is subsequently reapplied against the combustion space wall underneath the ignition source 9 whose distance from the center longitudinal axis 11 is larger than the distance of the sharp edge 4 from the center longitudinal axis 11. The fuel readily evaporates under the ignition source 9 as a result of the vortexing or eddying movement and of the pressure decrease in the turbulence area to the rear of the sharp edge 4.

Both in the embodiment according to FIG. 1 as also in the embodiment of FIG. 2, an ignitable mixture is brought in front of the ignition source independently of the rotational speed and of the load.

While I have shown and described only two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. An injection-type internal combustion engine with means for forming an approximately axially symmetrical combustion space having an axis of symmetry extending generally in the direction of the cylinder and with applied ignition by an ignition source, in which means are provided producing a swirling airstream in the combustion space, in which, with an unthrottled air supply for said airstream in the combustion space, fuel controlled in its quantity is injected with a nonnegligible free jet length at the end of the compression stroke by an injection means arranged in the cylinder head into the combustion space in the direction of the airstream guided along the wall of the combustion space and in which the ignition source extends into said combustion space characterized by a circumferential arcuate wall which is approximately symmetrical with respect to said axis and delimits said combustion space at least in part, extends—as viewed in plan view at right angle to said axis—at least over a part of its entire circumference in the direction of said airstream with a continuously decreasing radius of curvature similar to a spiral and passes over into the circumferential wall with the larger radius of curvature, under the formation of a sharp edge constituted by an outwardly extending wall portion disposed approximately along a diametric plane upstream of the ignition source, as viewed in the direction of the swirl of said airstream, and connecting the circumferential wall part having the smaller radius of curvature with the wall part having the larger radius of curvature.

2. An internal combustion engine according to claim 1 wherein the ignition source is located approximately opposite the sharp edge in the extension of the part of the circumferential wall of the combustion space disposed on the smallest radius.

3. An internal combustion engine according to claim 2, in which the injected fuel prior to reaching the circumferential wall of the combustion space is taken along by the airstream, the distance of the sharp edge from the center longitudinal axis through the combustion space being larger than the distance of the ignition source from said axis.

4. An internal combustion engine according to claim 2, in which the fuel is injected against the circumferential walls of the combustion space, and in which the distance of the sharp edge from the center longitudinal axis through the combustion space is smaller than the distance of the ignition source from said axis.

5. An internal combustion engine according to claim 4, wherein the sharp edge—as viewed in plan view—is disposed within an angular area of 15° to 25° upstream of the ignition source.

6. An internal combustion engine according to claim 5, wherein said ignition source is a spark plug.

7. An internal combustion engine according to claim 5, wherein said ignition source is a glow plug.

8. An internal combustion engine according to claim 3, wherein the sharp edge—as viewed in plan view—is disposed within an angular area of 15° to 25° upstream of the ignition source.

9. An internal combustion engine according to claim 8, wherein said ignition source is a spark plug.

10. An internal combustion engine according to claim 8, wherein said ignition source is a glow plug.

11. An internal combustion engine according to claim 1, in which the injected fuel prior to reaching the circumferential wall of the combustion space is taken along by the airstream, the distance of the sharp edge from the center longitudinal axis through the combustion space being larger than the distance of the ignition ignition source from said axis.

12. An internal combustion engine according to claim 1, in which the fuel is injected against the circumferential walls of the combustion space, and in which the distance of the sharp edge from the center longitudinal axis through the combustion space is smaller than the distance of the ignition source from said axis.

13. An internal combustion engine according to claim 13, wherein the sharp edge—as viewed in plan view—is disposed within an angular area of 15° to 25° upstream of the ignition source.

14. An internal combustion engine according to claim 13, wherein said ignition source is a spark plug.

15. An internal combustion engine according to claim 13, wherein said ignition source is a glow plug.

16. An injection-type internal combustion engine with applied ignition, comprising approximately axially symmetrical combustion space means having arcuate circumferential wall means about its axis of symmetry, means producing a swirling airstream in said combustion space means substantially about said axis, injection means for injecting fuel, controlled in its quantity, at the end of the compression stroke into said combustion space means in the direction of said airstream guided along the wall means, the circumferential wall means of the combustion space means—as viewed in plan view at right angle to said axis—extending at least over a part of its entire circumference in the direction of said airstream with a decreasing radius as measured from said axis thereby forming a spirallike configuration of said part, further means directly connecting the part of the circumferential wall means of smaller radius with the part thereof of larger radius by an outwardly extending wall portion forming a sharp edge in the transition of the circumferential wall means from the part with smaller radius into the part with larger radius, and ignition means located downstream of the sharp edge as viewed in the direction of the swirl of the airstream, said ignition means extending at least in part into said combustion space means.

17. An injection-type internal combustion engine according to claim 16, wherein said further means is a wall part disposed approximately on a diametric plane.

18. An internal combustion engine according to claim 16, wherein the ignition means is disposed approximately in the extension of the part of the circumferential wall means located on the smallest radius.

19. An internal combustion engine according to claim 16, in which the injected fuel prior to reaching the circumferential wall means of the combustion space means is taken along by the airstream the distance of the sharp edge from the center longitudinal axis through the combustion space means being larger than the distance of the ignition means from said axis.

20. An internal combustion engine according to claim 16, in which the fuel is injected against the circumferential wall means of the combustion space means, and in which the distance of the sharp edge from the center longitudinal axis through the combustion space means is smaller than the distance of the ignition means from said axis.

21. An internal combustion engine according to claim 16, wherein the sharp edge—as viewed in plan view—is disposed within an angular area of 15° to 25° p stream of the ignition means.

22. An injection-type internal combustion engine with a piston according to claim 1, characterized in that the axially symmetrical combustion space is arranged within said piston.

23. An injection-type internal combustion engine with piston means according to claim 16, wherein the combustion space means is arranged within said piston means.